United States Patent [19]

Sawada et al.

[11] Patent Number: 5,633,730

[45] Date of Patent: May 27, 1997

[54] TELEMATIC TERMINAL WHICH PRODUCES AND EDITS MIXED MODE DOCUMENT

[75] Inventors: Nozomi Sawada; Yukikazu Mori, both of Ebina, Japan

[73] Assignee: Ricoh Company, Ltd., Tokyo, Japan

[21] Appl. No.: 439,555

[22] Filed: May 11, 1995

Related U.S. Application Data

[63] Continuation of Ser. No. 812,095, Dec. 23, 1991, abandoned.

[30] Foreign Application Priority Data

Dec. 26, 1990  [JP]  Japan ................ 2-414032

[51] Int. Cl.$^6$ .............. H04N 1/40; H04N 1/387; H04N 1/00
[52] U.S. Cl. ............ 358/462; 358/434; 358/448; 358/452; 358/453; 382/176
[58] Field of Search ............ 358/443, 448, 358/452, 453, 462, 463, 464, 434, 437, 439; 382/175, 176, 180, 317; 395/144–146; H04N 1/387

[56] References Cited

U.S. PATENT DOCUMENTS

| 4,672,459 | 6/1987 | Kudo | 358/462 |
|---|---|---|---|
| 4,827,349 | 5/1989 | Ogata et al. | 358/434 |
| 4,922,349 | 5/1990 | Abe et al. | 358/400 |
| 5,041,918 | 8/1991 | Ishida et al. | 358/450 |
| 5,333,062 | 7/1994 | Hara et al. | 358/437 |
| 5,377,021 | 12/1994 | Mori | 358/462 |
| 5,402,250 | 3/1995 | Ishida et al. | 358/452 |
| 5,465,326 | 11/1995 | Sawada | 358/462 |

Primary Examiner—Edward L. Coles, Sr.
Assistant Examiner—Kimberly A. Williams
Attorney, Agent, or Firm—Oblon, Spivak, McClelland, Maier & Neustadt, P.C.

[57] ABSTRACT

A telematic terminal produces a mixed mode document in which characters and figures are mixedly arranged on the same page thereof, and transmits them to another communication apparatus. The characters can be written down on the mixed mode document when the telematic terminal is set at a first mode, while the figures can be written down on the mixed mode document when the telematic terminal is set at a second mode. Since the telematic terminal is set at a first mode, it is not necessary for the operator who attempts to input the characters to initially set the telematic terminal at the first mode.

19 Claims, 5 Drawing Sheets

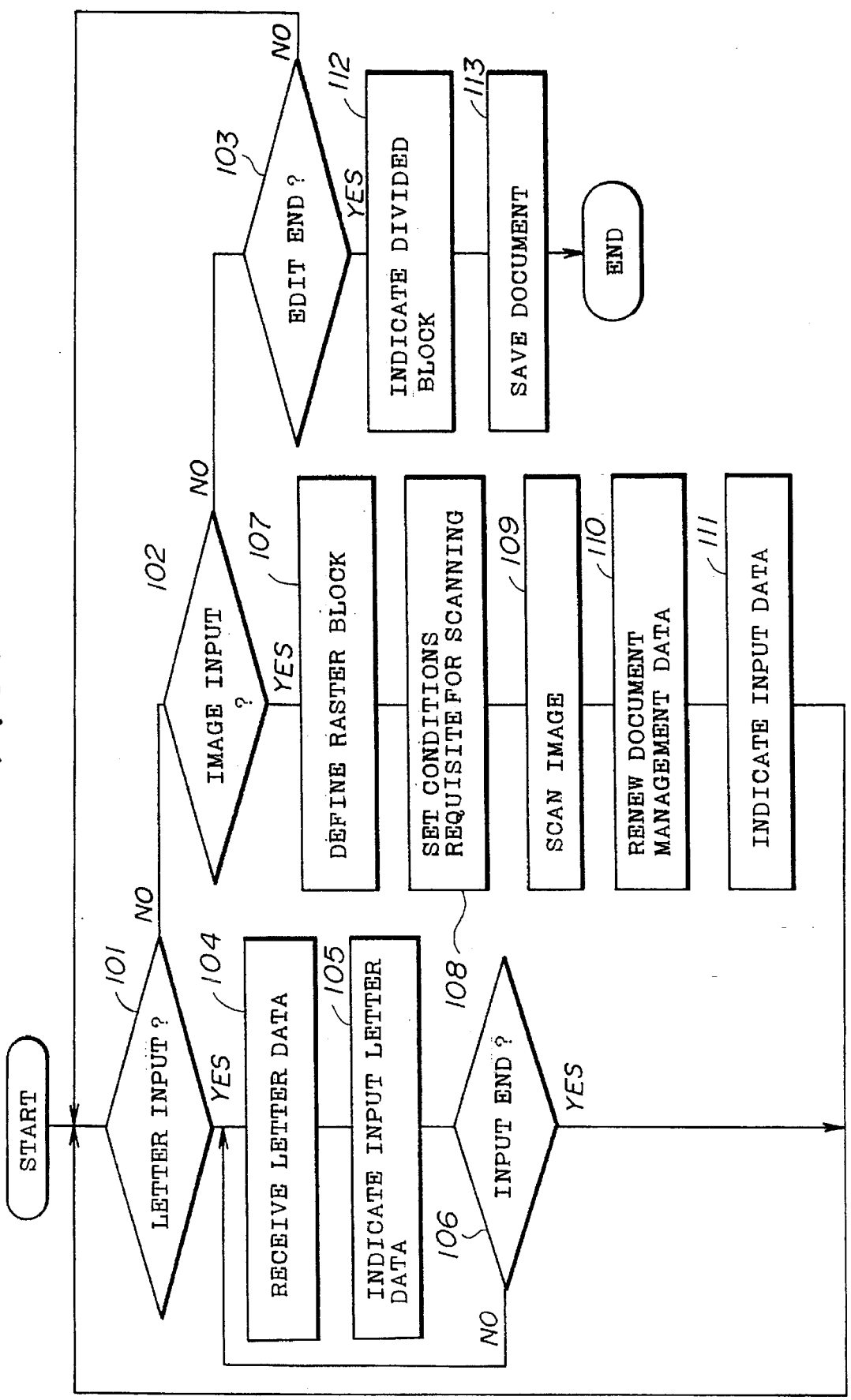

TELEMATIC TERMINAL WHICH PRODUCES AND EDITS MIXED MODE DOCUMENT

This application is a continuation of application Ser. No. 07/812,095, filed on Dec. 23, 1991, now abandoned.

BACKGROUND OF THE INVENTION

The present invention relates generally to a telematic terminal which produces and edits a mixed mode document transmitted by the telematic terminal.

Comité Consultatif International Télégraphique et Téléphonique (abbreviated CCITT hereinafter) defines telematic services, used for a group 4 (G4) facsimile apparatus (abbreviated FAX hereinafter), teletex, and videotex, and provides various definitions about them. A mixed mode document is one of the telematic services, on the same page of which characters (and also letters) and figure are mixedly arranged but individually transmitted to a receiver terminal. Generally, the character is converted into and transmitted as code data, and the figure is converted into and transmitted as raster data. Each page of a mixed mode document is divided into a plurality of blocks, on which the characters and figures are respectively allotted, the block used for the character being called a text block, and the block used for the figure being called a raster block. It is necessary to define the text block and/or the raster block before arranging the character or the figure with a predetermined format on a desired block.

The CCITT defines a protocol of the mixed mode in the T.501 in which a value defining a format is predetermined for the character and figure. That is, each of the characters and figures can be arranged with either a normal format or an abnormal format. The normal format is a mandatory format for each telematic terminal, so that the receiver terminal can always accept a mixed mode document arranged with the normal format received from a transmitter terminal. However, the abnormal format is optional for each telematic terminal, so that the receiver terminal can accept a character arranged with the abnormal format only when the receiver terminal is equipped with the value of the abnormal format. In this case, the character arranged with the abnormal format can be converted into the raster data, and then transmitted to the receiver. Incidentally, the raster data of the abnormal format can be converted into the normal format by the receiver terminal. As a terminal or machine complying with the above-described protocol must always be able to process a normal format document, the terminal must possess what shall be called "standard resources." Because the abnormal format is optional and is not required to be able to be processed by a terminal, some terminals will have "optional resources" to process the abnormal format.

The letter interval of the character has a value of the normal format of 10 letters/inch and values of the abnormal format of 6, 12, and 15 letters/inch. The line interval of the character has values of the normal format of 3, 4, 6 and 12 lines/inch and a value of the abnormal format of 8 lines/inch. The resolution of the raster data has values of the normal format of 240 and 300 picture elements (pixels)/inch, and values of the abnormal format of 200, 400, 600 and 1200 pixels/inch.

However, the conventional telematic terminal has the following disadvantages:

1. It is troublesome to define a text block and/or raster block whenever an operator attempts to input a character and/or a figure to a mixed mode document. It is not necessary to define a text block when the operator inputs a letter to a word processor. However, when the telematic terminal is used as the word processor, the operator has to define the text block, which is troublesome;
2. The receiver terminal cannot freely edit a character transmitted as the raster data, whereas the receiver terminal can freely edit the character transmitted as the code data; and
3. The raster data which is converted from an abnormal format into a normal format is often exposed to deterioration. For example, the resolution with the abnormal value 400 ppi (pel per inch) is converted to the resolution with the normal value 300 ppi.

SUMMARY OF THE INVENTION

Accordingly, it is a general object of the present invention to provide a novel and useful telematic terminal in which the above disadvantages are eliminated.

Another and more specific object of the present invention is to provide a telematic terminal which can produce a mixed mode document with procedures simpler than those of the conventional one, and inform an operator thereof of the existence of an abnormal format.

According to one feature of the present invention, a communication apparatus comprises document producing means for editing and producing a mixed mode document in which characters and figures are mixed on a same page thereof, it being possible to arrange the characters on the mixed mode document when the document producing means is set at a first mode, and it being possible to arrange the figures on the mixed mode document when the document producing means is set at a second mode, control means, coupled to the document producing means, for controlling the document producing means so that the document producing means can be initially set at the first mode, and communicating means, coupled to the document producing means and control means, for communicating with another communication apparatus.

According to the present invention, since the document producing means is set at the first mode by the control means, it is not necessary for an operator of the document producing means who is attempting to input the character to initially set the document producing means at the first mode.

Other objects and further features of the present invention will become apparent from the detailed description when read in conjunction with the accompanying drawings.

BRIEF DESCRIPTION OF THE DRAWINGS

FIG. 4 shows a first flowchart executed by the telematic terminal shown in FIG. 1.

DETAILED DESCRIPTION OF THE PREFERRED EMBODIMENTS

Figure 1:
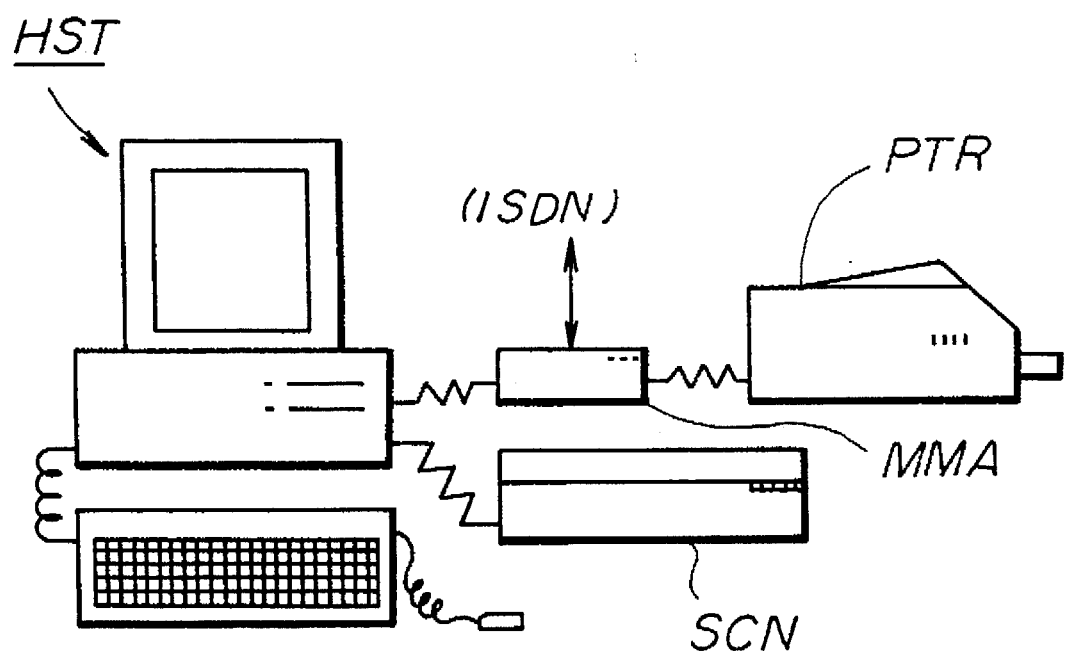
FIG. 1 shows a telematic terminal according to the present invention.

A telematic terminal according to the present invention comprises, as shown in FIG. 1, a host machine (HST), scanner (SCN), mixed mode communication adapter (MMA) and page printer (PTR). The host machine is connected to the scanner and mixed mode communication adapter. The mixed mode communication adapter is further connected to the page printer. The scanner reads out images on a document. The mixed mode communication adapter functions as mixed mode terminal equipment. The page printer comprises a laser printer.

Figure 2:
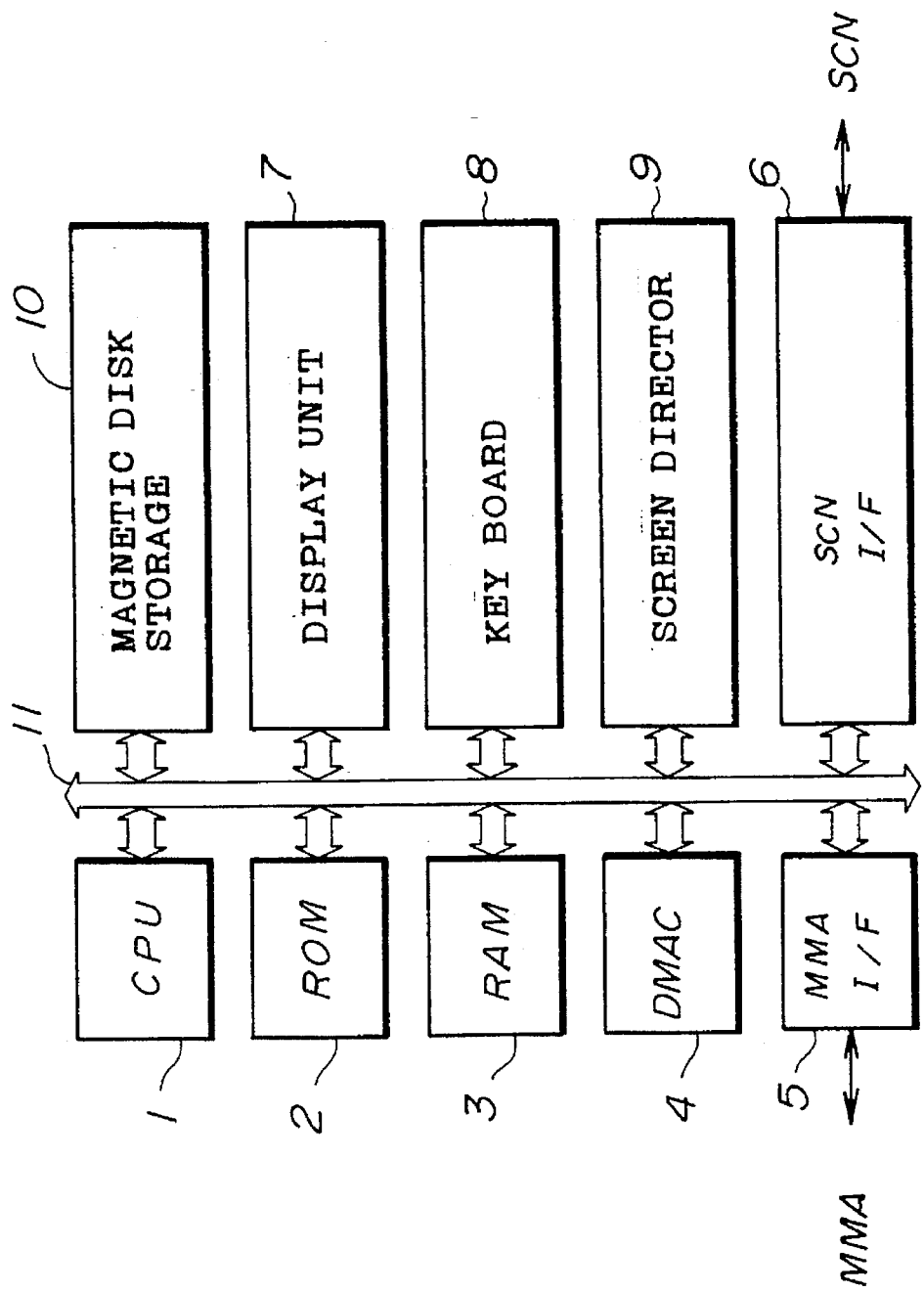
FIG. 2 shows a block diagram of a host machine shown in FIG.1.

The host machine, which produces a mixed mode document and edits it, comprises, as shown in FIG. 2, a central processing unit (CPU) 1, read only memory (ROM) 2, random access memory (RAM) 3, direct memory access controller (DMAC) 4, MMA interface (I/F) 5, SCN I/F 6, display unit 7, keyboard 8, screen director 9, and magnetic disk storage 10. Each part of the host computer can communicate with each other part via a system bus 11.

The CPU 1 controls each part of the host machine 1. The ROM 2 stores process programs executed by the CPU 1, and various supplemental programs for the process programs. The RAM 3 constructs a work area of the CPU 1. The DMAC 4 performs data transmission with a high speed between each part of the telematic terminal without being interfered with by the CPU 1. The MMA interface 5 is connected to the MMA to communicate therewith. The SCN interface 6 is connected to the scanner to communicate therewith. The display unit 7 indicates various data on a screen in response to an instruction of an operator of the host machine. The operator can input various data into the host machine via a keyboard 8. In addition, the operator can designate an arbitrary point on a coordinate of the screen of the display unit 7 via the screen director 9. The magnetic disk storage 10 stores various data, such as a produced mixed mode document, application program, and operating system used for the host machine.

Figure 3B:
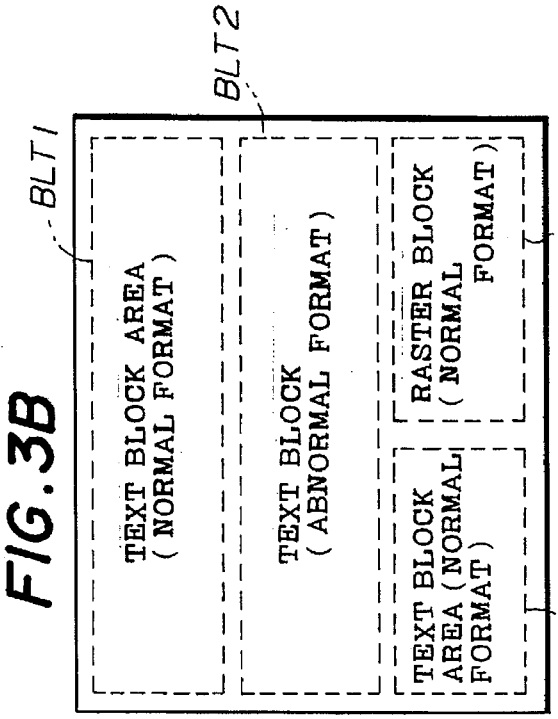
FIGS. 3A to 3C respectively show mixed mode documents produced by the host computer shown in FIG. 2.
Figure 3C:
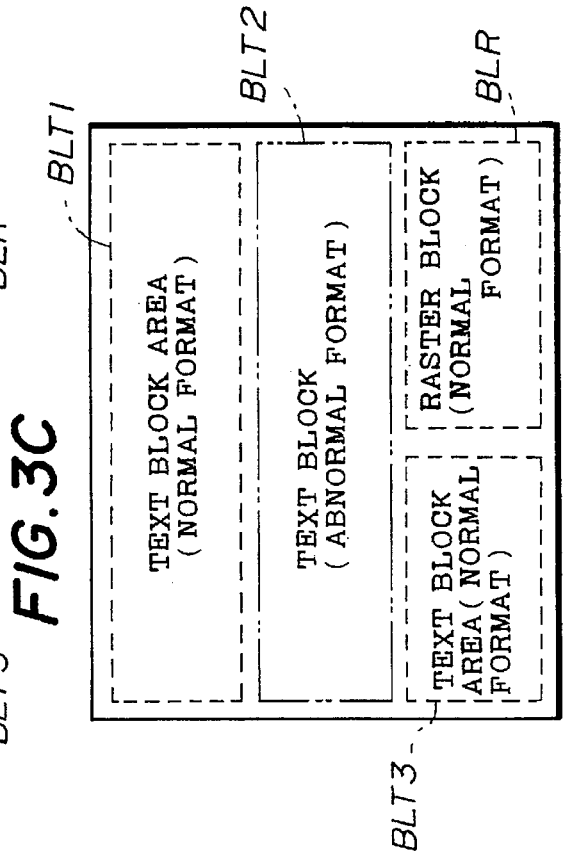
Figure 3A:
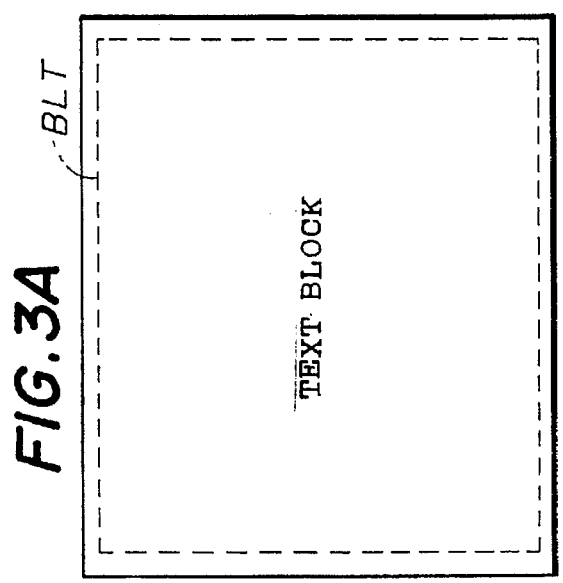

When the operator starts the application program used to produce a mixed mode document, the host computer automatically produces, as shown in FIG. 3A, a text block (letter block) (BLT) having a size of one page of a mixed mode document. Then a letter data string input by the operator is sequentially written down on the text block. Thus, conveniently, it is not necessary for the operator to define a block when he/she inputs a character (and/or letter) to the host machine. In addition, the operator can adjust letter and character intervals.

On the other hand, when the operator attempts to input a figure (image) on the text block, he/she defines a raster block and then arranges on the defined raster block the figure scanned by the scanner, while adjusting a resolution of the raster data and other conditions.

After the operator stores one produced page of the mixed mode document in the magnetic disk storage 10, the host machine judges the existence of an abnormal format. If the host machine detects an abnormal format, the text block is divided into four blocks BLT1, BLT2, BLT3 and BLR, as shown in FIG. 3B. The host machine then discriminates the frame of the block BLT2 from those of the other blocks BLT1, BLT3 and BLR, so that the operator can easily discriminate the block arranged with an abnormal format. Thus, the operator can easily judge whether the produced mixed mode document includes the abnormal format, and can convert the abnormal format block into a normal format block, if necessary.

In summary, according to the present invention, since a text block is automatically produced on a new page, it is not necessary for the operator to define a text block. In addition, since each page of the text block is divided so as to discriminate an abnormal format block from a normal format block, the operator can clearly judge the existence and position of the block of the abnormal format.

Figure 5:
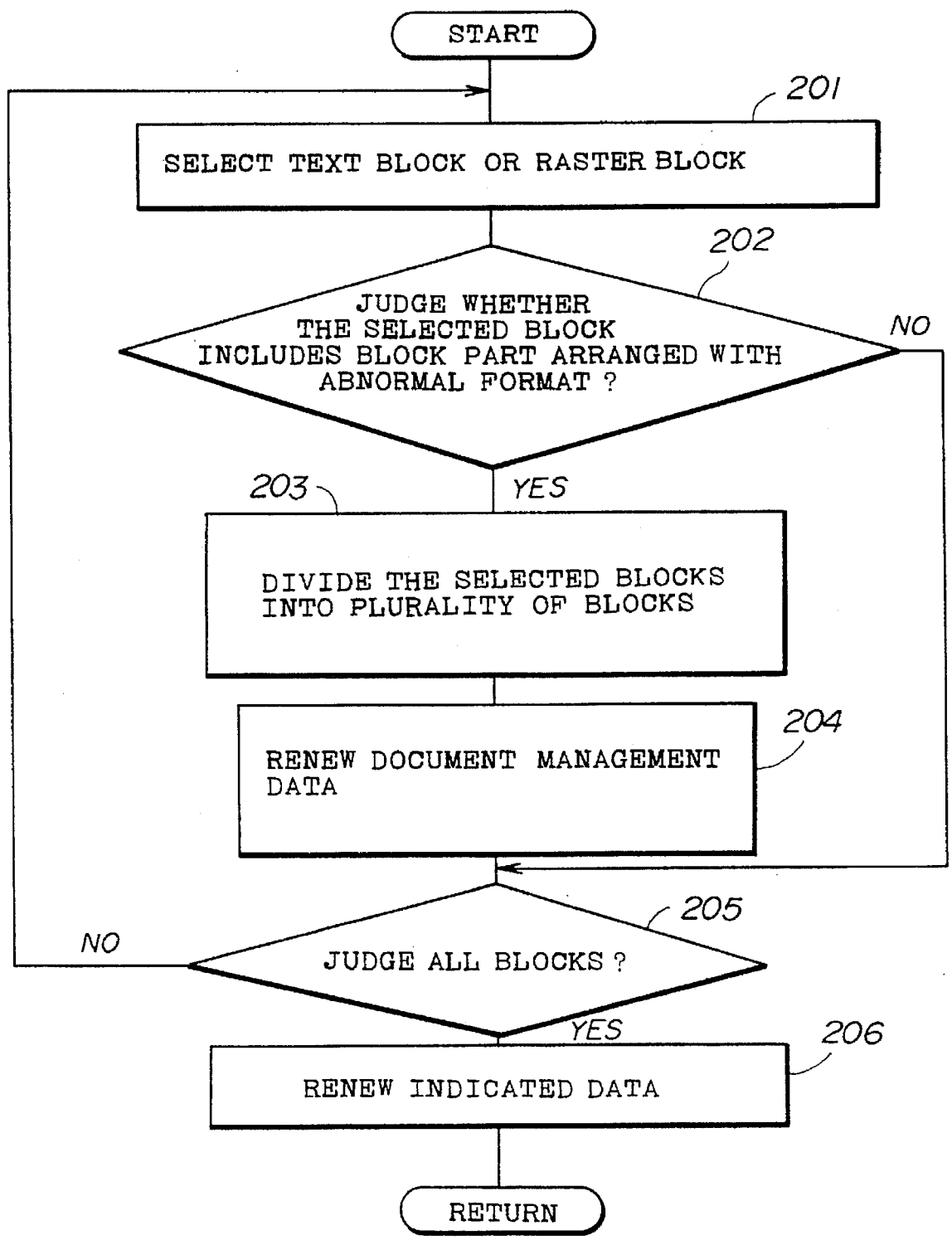
FIG. 5 shows a second flowchart executed by the telematic terminal shown in FIG. 1.

Next follows a description, with reference to FIG. 4, of the procedure executed by the telematic terminal shown in FIG. 1. The host machine monitors whether the operator selects "letter input", "image input", or "edit end" from a menu (in steps 101, 102 and 103). If the operator selects the letter input (in the step 101), the host machine receives letter data input by the operator and indicates the input letter data on the screen of the display unit 7 until the operator terminates inputting of the letter data (in steps 104, 105 and 106). If the operator selects the image input (in the step 102), the host machine defines a raster block (in step 107), and sets conditions requisite for scanning an image (in step 108). Subsequently, the scanner scans the image (in step 109). Simultaneously, the host machine arranges the scanned image on the defined raster block. Then, the inputting of one raster block of data to the host machine is completed, the layout data of the raster block is added to a document management data to renew it (in step 110), and new input data is indicated (in step 111). If the operator selects the edit end in order to terminate editing of the mixed mode document (in the step 103), the host machine divides the text block, as shown in FIG. 5, and indicates the divided text block (in step 112). The host machine saves the produced document in the magnetic disk storage 10 (in step 113).

Next follows, with reference to FIG. 5, a dividing text block operation executed by the host machine. First, the host machine selects a text block or a raster block (in step 201), and then judges whether the selected block includes a block part arranged with an abnormal format (in step 202). If the selected block includes the block part arranged with the abnormal format, the selected block is divided into a plurality of block parts so as to make it possible to discriminate the block part arranged with the abnormal format from other block parts arranged with a normal format (in step 203). The host machine then renews a document management data by adding layout data of the divided block (in step 204). The above procedure continues until all the blocks are processed (in step 205) and indicated data is finally renewed (in step 206).

Incidentally, the host machine may serve the mixed mode communication adapter.

Further, the present invention is not limited to these preferred embodiments, and various variations and modifications may be made without departing from the scope of the present invention.

What is claimed is:

1. A communication apparatus comprising:

text-block allocating means for initially setting an entire page of a mixed mode document as being occupied by a text block, in which text block characters may be arranged so that an operator may arrange characters of said entire page occupied by said text block;

raster-block forming means for forming a raster block in which figures may be arranged according to the operation performed by the operator onto said communication apparatus so that the operator may arbitrarily arrange the figures within the entirety of said page;

abnormal-format defining means for defining an area of either said raster block or said text block, said area comprising a respective one of the figures and characters with an abnormal format; and discriminating means for discriminating said area defined by said abnormal-format defining means from the remaining area with the entirety of said page.

2. The communication apparatus according to claim 1, further comprising:

communication means for transferring data associated with at least one of the characters and figures between said communication apparatus and another communication apparatus.

3. The communication apparatus according to claim 1, wherein said text-block allocating means initially and automatically determines said entire page of said mixed mode document as being occupied by said text block.

4. The communication apparatus according to claim 1, wherein said text-block allocating means initially determines said entire page of said mixed mode document as being occupied by said text block prior to editing and/or processing operations performed on said mixed mode document by said operator.

5. The communication apparatus according to claim 1, wherein said text-block allocating means initially determines said entire page of said mixed mode document as being occupied by only a single one of said text block.

6. An apparatus for producing and editing a mixed mode document, comprising:

a controller;

text-block allocating means controlled by the controller for initially setting an entire page of a mixed mode document as being occupied by a text-block, in which text block characters may be arranged on said entire page occupied by said initially set text block; and raster-block forming means controlled by the controller for forming raster-blocks to be arranged in the mixed mode document after the initial setting of the text block by the text allocating means.

7. The apparatus according to claim 5, further comprising:

abnormal-format defining means for defining an area of either said raster block or said text as including an abnormal format; and discriminating means for discriminating said area defined by said abnormal-format defining means from a remaining area.

8. The apparatus according to claim 7, wherein said discriminating means divides an arbitrary block included in the plurality of blocks into a first block and a second block, on which arbitrary block characters arranged with the normal format and the abnormal format are mixedly arranged, the first bock including the characters or figures arranged only with the normal format, and the second block, including the characters or figures arranged only with the abnormal format.

9. The apparatus according to claim 6, wherein said apparatus communicates with another apparatus via an Integrated Service Digital Network (ISDN).

10. The apparatus according to claim 6, further comprising a telematic terminal.

11. The apparatus according to claim 6, wherein the apparatus belongs to a third class of a group 4 facsimile apparatus.

12. The apparatus according to claim 6, further comprising means for displaying said plurality of blocks.

13. A method for producing and editing a mixed mode document, comprising the steps of:

initially setting an entire page of a mixed mode document as being occupied by a text-block, in which text block characters may be arranged on said entire page occupied by said initially set text block; and forming raster-blocks to be arranged in the mixed mode document after the initial setting of the text block by the text allocating means.

14. The method according to claim 13, further comprising the steps of:

defining an area of either said raster block or said text as including an abnormal format; and discriminating said area defined by said abnormal-format defining means from a remaining area.

15. The method according to claim 13, wherein said step of discriminating includes the substep of dividing an arbitrary block included in the plurality of blocks into a first block and a second block, on which arbitrary block characters arranged with the normal format and the abnormal format are mixedly arranged, the first bock including the characters or figures arranged only with the normal format, and the second block including the characters or figures arranged only with the abnormal format.

16. The method according to claim 13, further including the step of communicating with at least one communication apparatus via an Integrated Service Digital Network (ISDN).

17. The method according to claim 13, wherein the mixed mode document is produced and edited in a telematic terminal.

18. The method according to claim 13, wherein the mixed mode document is produced and edited in an apparatus which belongs to a third class of a group 4 facsimile apparatus.

19. The method according to claim 13, further comprising the step of displaying said plurality of blocks.

* * * * *